Patented Dec. 26, 1939

2,184,303

UNITED STATES PATENT OFFICE

2,184,303

PHOTOGRAPHIC COLOR-FORMING DEVELOPER AND EMULSION

Andrew B. Jennings, New Brunswick, and Edmund B. Middleton, Metuchen, N. J., assignors to Du Pont Film Manufacturing Corporation, New York, N. Y., a corporation of Delaware No Drawing. Application June 24, 1938, Serial No. 215,702

9 Claims. (Cl. 95—6)

This invention relates to color photography, more particularly it relates to color forming photographic emulsions, still more particularly it relates to photographic elements bearing emulsions which develop to form metallic silver and dyes in image areas in admixture with each other. The invention also relates to photographic developers and to finished colored photographs.

This invention has for an object the preparation of photographic emulsions containing novel and improved water insoluble dye-forming bodies or color-formers which yield colored dyes by coupling with the oxidation products of photographic developing agents. A further object is the preparation of photographic elements bearing an emulsion which contains novel color formers which do not migrate. A still further object is the preparation of multilayer photographic films containing color-formers which do not migrate from layer to layer or into the processing baths. A still further object is the preparation of finished photographs which contain stable dyed images which are formed of water insoluble dyes. Other objects include the preparation of colored photographs and color forming emulsions upon opaque or transparent supports and a general advance in the art. Still other objects will appear hereinafter.

The above and other objects are accomplished by the following invention which involves the use of compounds having the general formula

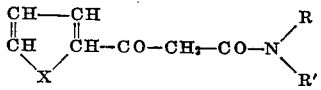

wherein X is an atom taken from the class consisting of oxygen and sulfur, R is a radical selected from the group consisting of aryl and azole groups and as color forming agents, and R' is a member of the group consisting of hydrogen and hydrocarbon radicals.

It has been found that the above described compounds which have a furan or a thiophene nucleus attached to an acetoacetamide linkage are suitable color formers since they couple readily and do not migrate from the place of formation or deposition. The furan or thiophene nucleus has a very definite effect upon the color of the dyes formed upon coupling with aromatic amino photographic developing agents, in that the dyes transmit greater amounts of light of the longer wave lengths than the corresponding open chain derivatives. This is of importance in three color photography, and also of particular importance in two color photography. The dyes formed are yellow to yellow-orange in color and have good tinctorial strength and uniformity. Many of them are of an excellent lemon yellow color. These dyes may be used in developers containing sulfite, e. g. sodium sulfite.

The radical R in the above formula may be a substituted or unsubstituted aryl radical or an azole radical which may be substituted or unsubstituted. The aryl radicals may be substituted, for example, with one or more of the following atoms or groups: halogen atoms, e. g., chlorine and bromine, hydroxyl groups, alkoxy groups, e. g., methoxy, ethoxy, isopropoxy, nitro groups, amino and hydrocarbon substituted amino groups, benzoyl groups, phenyl azo groups, etc. The radical R' in the above formula may be hydrogen or alkyl, aryl, aralkyl or cycloalkyl radicals which may be substituted.

Specific examples of compounds falling within the scope of the invention are the furoyl-acet-derivatives of the following amino compounds.

p-toluidine
2,5-dichloro aniline
2-amino-6-methyl benzothiazole
p-aminophenyl morpholine
p-anisidine
p-phenetidine
p-chloro-aniline
2,5-diethoxy aniline
Alpha-naphthylamine
Beta-naphthylamine
Benzidine
Dianisidine
Tolidine
p-aminophenyl piperidine
p-amino dimethyl aniline
Benzoyl-p-phenylenediamine
p-phenylenediamine
N-ethyl-N-benzyl-p-phenylenediamine
N-ethyl-N-phenyl-p-phenylenediamine
2,5-dimethyl aniline
4-chloro-2,5-dimethyl aniline
2,3,5,6-tetramethyl aniline
2-chloro-5-methyl aniline
m-toluidine
3-bromo-4-methyl aniline
3-nitro-4-methyl aniline
2,5-diethoxy-4-chloro-aniline
2,5-dimethoxy-4-chloro-aniline
2,5-diethoxy-4-furoylamino aniline
3-benzoylamino-4-methoxy aniline
4-benzoylamino-3-methoxy aniline
5-bromo-2-methoxy aniline
o-phenoxy aniline 2,5-diethoxy-4-nitro aniline
m-nitro aniline
p-nitro-aniline
p-phenoxy aniline
o-chloro aniline
p-aminophenyl-benzyl ether
4-chloro-2-methoxy-5-isopropyl aniline
p-fluoro-aniline
2-nitro-4,6-dimethyl aniline
2-amino benzoyl-o-toluidine
p-amino benzoyl-2-amino benzothiazole
2-methoxy-4-nitro aniline
p-amino-p'-hydroxy-azobenzene Substituents, in general have only a slight effect upon the shade obtained. Nitro groups

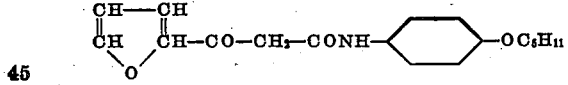

seem to redden the yellow colors. Alkoxy groups tend to lighten the shades of yellow and therefore are preferred substituents.

The above-described class of coupling components or color-formers may be incorporated in a photographic emulsion or they may be added to a developer solution. They may be used in conjunction with the usual sensitizing dyes which are used to extend the sensitivity of silver halide emulsions. An exposed photographic element may then be developed in the usual manner as described below.

The invention will be further illustrated but is not intended to be limited by the following examples:

*Example I*

To 100 ccs. of 2% by weight aqueous gelatin solution is added a solution consisting of 8 ccs. of ethyl alcohol and 1 gram of the compound having the formula:

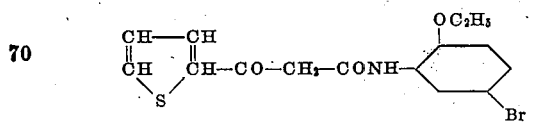

The total weight of the combined solution is then brought to about 150 grams with water and then the mixture is added to 100 grams of a gelatino-silver halide emulsion and mixed thoroughly. The resulting emulsion may then be coated upon a suitable support such as paper, glass or a cellulose derivative base, or upon another photographic emulsion layer which may or may not be another color-forming dye component. After exposure directly in a camera or by printing through appropriate color records, the film is developed by means of an alkaline solution of diethyl-p-phenylenediamine, whereupon a light yellow dye of good strength and color forms.

Furoylaceto-p-chlor-o-phenitidine gives similar results when substituted in similar amounts.

*Example II*

To 100 ccs. of 2% by weight aqueous gelatin solution is added a solution consisting of 8 ccs. of ethyl alcohol and 1 gram of the compound having the formula:

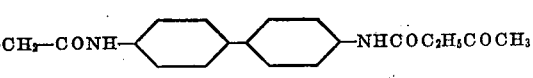

The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example I. After exposure, the photographic element is developed in an alkaline solution containing diethyl-p-phenylene diamine whereupon a yellow dye of good tinctorial strength is formed.

*Example III*

To 100 ccs. of 2% by weight aqueous gelatin solution is added a solution consisting of 8 ccs. of ethyl alcohol and 1.5 grams of the compound having the formula:

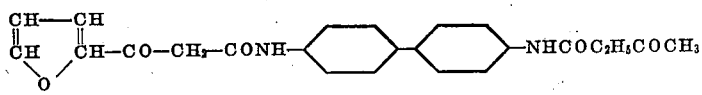

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example I. After exposure the photographic element is developed in an alkaline solution containing dimethyl-p-phenylene diamine, whereupon a yellow dye light in color and of good tinctorial strength is formed.

*Example IV*

To 100 ccs. of 2% by weight aqueous gelatin solution consisting of 8 ccs. of ethyl alcohol and 1.5 grams of the compound having the formula:

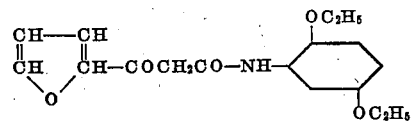

together with a 20% aqueous caustic soda solution in an amount equal to 2 mols of alkali for each mol of the compound. The total weight of the combined solution is then brought to about 150 grams with water and then the mixture is added to 100 grams of a gelatino-silver halide emulsion and mixed thoroughly. The resulting emulsion may then be coated upon a suitable photographic support after the manner described in Example I. After exposure the photographic element is developed in an alkaline solution containing dimethyl-p-phenylene diamine, whereupon a yellow dye light in color and of good tinctorial strength is formed.

*Example V*

To 100 ccs. of a developer having the following composition:

Diethyl-p-phenylenediamine hydrochloride_ g__ 2
Sodium sulfite (anhydrous) _____g__ 5
Sodium carbonate (anhydrous) _____g__ 20
Water _____cc__ 1000 are added from 0.1 to 1.0 grams of furoylaceto-p-phenetidine dissolved in a few ccs. of ethyl alcohol. An exposed photographic element containing exposed silver salts is then developed in afore-described solution.

A positive silver image which has been bleached to a silver salt image may be redeveloped in this solution. A suitable bleach may comprise a liter of water containing about 35 grams of potassium ferricyanide and 5 ccs. of 20% ammonia water. Thorough washing between treatments is essential. After color-development, the silver may be removed, leaving a pure dye image, by bleaching in ferricyanide for example and fixing in plain hypo.

The above described furoylacetamides can be prepared in various ways. A practical method is by using a furoyl acetic ester as a starting material.

The substituted amides may be prepared by adopting a method somewhat as follows:

A condensation of ethyl furoylacetate (Am. Chem. Jour. vol. 44, pages 405 to 407) with aromatic amino compounds is effected smoothly by boiling in xylene with a trace of pyridine, 1 molecular equivalent of the ester (for each amino group) and .9 molecular equivalent of the amine. The amines tabulated below were employed, using .04 mol (except benzidine where .02 mol was used), 15 cc. of xylene, 2 drops of pyridine and 7.5 grams (6.5 cc.) of ester. The ester, xylene and pyridine were heated to gentle boiling in a small open flask and the amine added slowly, allowing the alcohol to escape. Boiling was continued for 10 minutes. After cooling, the products were filtered and recrystallized from alcohol except where noted.

| | Amine | Yield | Melting point | Color produced |
|---|---|---|---|---|
| | | Grams | Degrees | |
| 1 | P-toluidine | 6.5 | 142-4 | Yellow. |
| 2 | 2,5-dichlor-aniline | 5.0 | 144-5 | Do. |
| 3 | 2-amino-6-methyl-benzothiazole. | 4.0 | 235-40 (dec.) | Orange-yellow. |
| 4 | P-amino phenyl morpholine.* | 8.0 | 194-5 | Do. |
| 5 | P-anisidine | 6.0 | 108-9 | Yellow. |
| 6 | P-phenetidine | 5.5 | 126-7 | Do. |
| 7 | P-chlor-aniline | 6.0 | 131-3 | Do. |
| 8 | 2,5-diethyoxyaniline | 7.5 | 118-20 | Do. |
| 9 | Alpha-naphthylamine | 7.0 | 154-5 | Do. |
| 10 | Benzidine* | 4.0 | 250-53 (dec.) | Orange-yellow. |

*Compounds extracted with hot alcohol due to limited solubility.

The colors produced upon development with diethyl-p-phenylenediamine were all strong and of good brilliance and transparency.

In place of the specific color-former of Example IV, any of the specific color-formers listed in Examples I to III may be used in similar quantities. Likewise, any of the compounds specifically named above or falling within the scope of the above formula may be similarly used.

The silver halide emulsions above-described may form a single layer of a photographic element or may form one of a plurality of layers which may or may not contain another color-forming dye component. Alternatively, the silver halide emulsion may be coated on a plain or colored separating layer as one sensitive layer of a series of such layers on a monopack, multilayered film for use in color photography.

The photographic emulsions and emulsion layers may also contain the usual sensitizers such as the cyanine and carbocyanine salts and bases and the cyazines and carbocyazine salts and bases employed to extend the sensitivity of photographic emulsions.

In place of the specific aromatic amino developing agents of the above examples, others which may be used are the mono-, di- and tri-amino aryl compounds. The diamino aryl compounds such as para-phenylenediamine and its substitution products are preferred. These developers may be substituted in the amino groups as well as in the ring, preferably the former, to constitute compounds such as the alkyl arylenediamines, including the alkyl naphthylenediamines, alkyl phenylenediamines and alkyl tolu-ylenediamines. The compounds, of course, must have one free or unsubstituted amino group which enables the oxidation product of the developer to couple with the color-forming compounds. As examples of developers of the class described, there may be mentioned diethyl-p-phenylenediamine, dimethyl-p-phenylenediamine, monomethyl-p-phenylenediamine, naphthylenediamine-1,4, N-diethyl naphthylenediamine-1,4 and their acid salts. The salts of the bases, e. g., the hydrochloride and sulfate are preferred to the free bases since they are more soluble and more stable than the latter. Colloids other than gelatin may also be employed, e. g., gum arabic, starch or albumin.

Among the advantages of the color-forming compounds of this invention are:

A. When incorporated in a given photographic layer they do not migrate or diffuse either in their dry state or when the film is subjected to bathing in water or alkaline solutions.

B. These compounds will react with the oxidation product of a p-phenylenediamine developer, as produced in the reduction of silver halides, to form yellow to yellow-orange dye absorbing substantially in the blue to blue-green region so as to make them particularly useful in multicolor photography processes for the production of colored images.

C. The dyes thus produced do not tend to migrate nor diffuse after their formation.

As many apparently widely different embodiments of this invention may be made without departing from the spirit and scope thereof, it is to be understood that we do not limit ourselves to the invention described herein except as defined in the appended claims.

We claim:

1. A color-forming photographic emulsion containing a compound of the general formula:

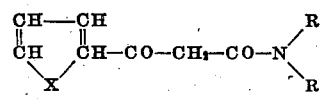

wherein X is an atom taken from the group consisting of oxygen and sulfur, R is a radical selected from the group consisting of aryl and azole groups, and R' is taken from the group consisting of hydrogen and hydrocarbon radicals.

2. A photographic element bearing an emulsion layer containing a compound of the general formula:

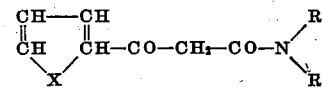

wherein X is an atom taken from the group consisting of oxygen and sulfur, R is a radical selected from the group consisting of aryl and azole groups, and R' is taken from the group consisting of hydrogen and hydrocarbon radicals.

3. A multilayer photographic element at least one layer of which comprises a silver halide emulsion layer containing a compound of the general formula:

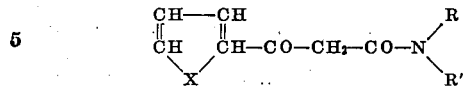

wherein X is an atom taken from the group consisting of oxygen and sulfur, R is a radical selected from the group consisting of aryl and azole groups, and R' is taken from the group consisting of hydrogen and hydrocarbon radicals.

4. A color-forming photographic developer comprising a compound of the general formula:

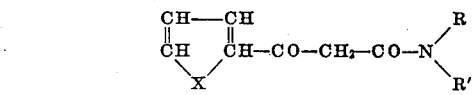

wherein X is an atom taken from the group consisting of oxygen and sulfur, R is a radical selected from the group consisting of aryl and azole groups, and R' is taken from the group consisting of hydrogen and hydrocarbon radicals, and an aromatic amino photographic developing agent.

5. A photographic element bearing a gelatino-silver halide emulsion containing a compound of the general formula:

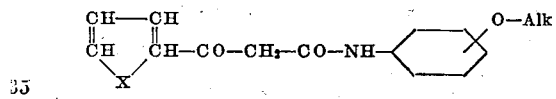

wherein X is an atom taken from the class consisting of oxygen and sulfur and Alk is an alkyl radical of 1 to 10 carbon atoms.

6. A color-forming photographic developer containing a compound of the general formula:

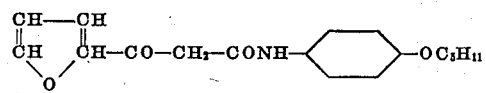

7. A color-forming photographic emulsion containing thienoylacet-5-bromo-2-ethoxyanilide.

8. A process which comprises developing a photographic element bearing an exposed silver halide emulsion layer with an aromatic amino developing agent in the presence of a compound of the general formula:

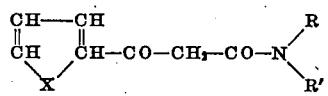

wherein X is an atom taken from the group consisting of oxygen and sulfur, R is a radical selected from the group consisting of aryl and azole groups, and R' is taken from the group consisting of hydrogen and hydrocarbon radicals.

9. A process which comprises developing a photographic element bearing an exposed emulsion layer with an aromatic amino developing agent in the presence of a compound of the general formula:

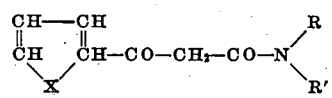

wherein X is an atom taken from the group consisting of oxygen and sulfur, R is a radical selected from the group consisting of aryl and azole groups, and R' is taken from the group consisting of hydrogen and hydrocarbon radicals.

ANDREW B. JENNINGS.
EDMUND B. MIDDLETON.